(12) United States Patent
Cozma et al.

(10) Patent No.: US 12,608,214 B2
(45) Date of Patent: Apr. 21, 2026

(54) AUTOMATED NETWORK BOOT IMAGE SERVER DETECTION AND SELECTION

(71) Applicant: Lenovo Enterprise Solutions (Singapore) Pte Ltd., Singapore (SG)

(72) Inventors: Alexandru Cozma, Bucharest (RO); Jeffery J Van Heuklon, Rochester, MN (US); Fred Allison Bower, III, Durham, NC (US); Li Jun Gu, Shanghai (CN)

(*) Notice: Subject to any disclaimer, the term of this patent is extended or adjusted under 35 U.S.C. 154(b) by 54 days.

(21) Appl. No.: 18/613,192

(22) Filed: Mar. 22, 2024

(65) Prior Publication Data

US 2025/0298627 A1    Sep. 25, 2025

(51) Int. Cl.
*G06F 9/4401* (2018.01)
*H04L 61/4511* (2022.01)

(52) U.S. Cl.
CPC ........ *G06F 9/4416* (2013.01); *H04L 61/4511* (2022.05)

(58) Field of Classification Search
CPC ............................ G06F 9/4416; H04L 61/4511
USPC .......................................................... 713/2
See application file for complete search history.

(56) References Cited

U.S. PATENT DOCUMENTS

| | | | | |
|---|---|---|---|---|
| 9,191,460 | B2 * | 11/2015 | Ridgill ................. | G06F 9/4416 |
| 9,665,380 | B2 * | 5/2017 | Hiltgen ................. | G06F 9/4416 |
| 10,180,845 | B1 * | 1/2019 | Nunes ..................... | H04L 67/34 |
| 12,067,402 | B2 * | 8/2024 | Haddad ................. | G06F 21/575 |
| 2017/0142196 | A1 * | 5/2017 | Sun ..................... | H04L 67/1008 |
| 2020/0184078 | A1 * | 6/2020 | Hinrichs .............. | H04L 9/3268 |

* cited by examiner

*Primary Examiner* — Brian T Misiura
(74) *Attorney, Agent, or Firm* — Jeffrey L. Streets

(57) ABSTRACT

A computer program product and method include the operations of loading an iPXE client that is stored in firmware, transmitting a query over a wide area network to a DNS server that requests the location of iPXE boot image servers that store a boot image for use by the computer, and receiving a DNS SRV record from the DNS server. The DNS SRV record identifies an Internet Protocol address for each of a plurality of iPXE boot image servers that are outside a subnet that includes the computer. The operations further include determining one or more network properties of network communication, such as latency, between the computer and each iPXE boot image server, identifying the iPXE boot image server having the most suitable value of network property(ies), such as latency, for obtaining the boot image, and booting the boot image obtained from the identified iPXE boot image server.

20 Claims, 5 Drawing Sheets

*20*

*41*

ICMP: latency 10

*40*

OS Repository #1
10.0.0.100

*51*

ICMP:
latency 250

*50*

OS Repository #2
10.0.0.200 server

*30*

DNS
Server

*20*

Boot OS from .100

*40*

OS Repository #1
10.0.0.100

*50*

OS Repository #2
10.0.0.200 server

*30*

DNS
Server

110

AUTOMATED NETWORK BOOT IMAGE SERVER DETECTION AND SELECTION

BACKGROUND

The present disclosure relates to methods for a computer to boot from a network.

BACKGROUND OF THE RELATED ART

The deployment of a server into an operating environment typically requires customization of the settings that control how the server boots up and operates. For example, a server may be tailored to load and use a particular operating system and application image. In some instances, the operating system and/or application image may already be stored locally on the server. However, it is also possible for a server to boot from a network, such as where the operating system and/or application are stored on another device, such as a boot server, within the same network subnet as the server. Furthermore, the server may be placed under the management of a provisioning software suite, such as XClarity® Administrator server management software available from Lenovo. These solutions may be suitable for implementations where there are many servers to be deployed in the same location and subnet. When deploying an edge computer, the need for local configuration or management represents an additional overhead or burden. It is generally not practical to have a boot server in the same subnet as the edge computer that is being deployed or to have a provisioning software suite that manages edge computers spread across numerous locations on a wide area network.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations comprise loading an iPXE client that is stored in firmware on a computer that includes the processor, wherein the iPXE client implements Preboot eXecution Environment (PXE) client software with the capability to use a wide area network communication protocol. The operations further comprise transmitting, during booting of the computer, a query over a wide area network to a Domain Name System (DNS) server, wherein the query requests the location of iPXE boot image servers that store a boot image for use by the computer, and receiving, in response to the query, a DNS Service (SRV) record over the wide area network from the Domain Name System server. The DNS Service record identifies an Internet Protocol address for each of a plurality of iPXE boot image servers that are outside a subnet that includes the computer. In addition, the operations comprise determining one or more network properties of network communication between the computer and each iPXE boot image server identified by the Domain Name System server, identifying one of the plurality of iPXE boot image servers having the most suitable network properties for obtaining the boot image, and booting the boot image obtained from the identified iPXE boot image server.

Some embodiments provide a computer-implemented method. The method comprises the operation of loading an iPXE client that is stored in firmware on a computer that includes the processor, wherein the iPXE client implements Preboot eXecution Environment client software with the capability to use a wide area network communication protocol. The operations further comprise transmitting, during booting of the computer, a query over a wide area network to a Domain Name System server, wherein the query requests the location of iPXE boot image servers that store a boot image for use by the computer, and receiving, in response to the query, a DNS Service record over the wide area network from the Domain Name System server. The DNS Service record identifies an Internet Protocol address for each of a plurality of iPXE boot image servers that are outside a subnet that includes the computer. In addition, the operations comprise determining one or more network properties of network communication between the computer and each iPXE boot image server identified by the Domain Name System server, identifying one of the plurality of iPXE boot image servers having the most suitable network properties for obtaining the boot image, and booting the boot image obtained from the identified iPXE boot image server.

Some embodiments may provide a method comprising performing a network boot on a plurality of computers, the network boot for each computer comprising various operations. The operations may include loading an iPXE client that is stored in firmware on the computer, wherein the iPXE client implements Preboot eXecution Environment client software with the capability to use a wide area network communication protocol. The operations may further comprise transmitting, during booting of the computer, a query over a wide area network to a Domain Name System server, wherein the query requests the location of iPXE boot image servers that store a boot image for use by the computer, and receiving, in response to the query, a DNS Service record over the wide area network from the Domain Name System server. The DNS Service record identifies an Internet Protocol address for each of a plurality of iPXE boot image servers that are outside a subnet that includes the computer. In addition, the operations comprise determining one or more network properties of network communication between the computer and each iPXE boot image server identified by the Domain Name System server, identifying one of the plurality of iPXE boot image servers having the most suitable network properties for obtaining the boot image, and booting the boot image obtained from the identified iPXE boot image server.

DETAILED DESCRIPTION

Figure 1:
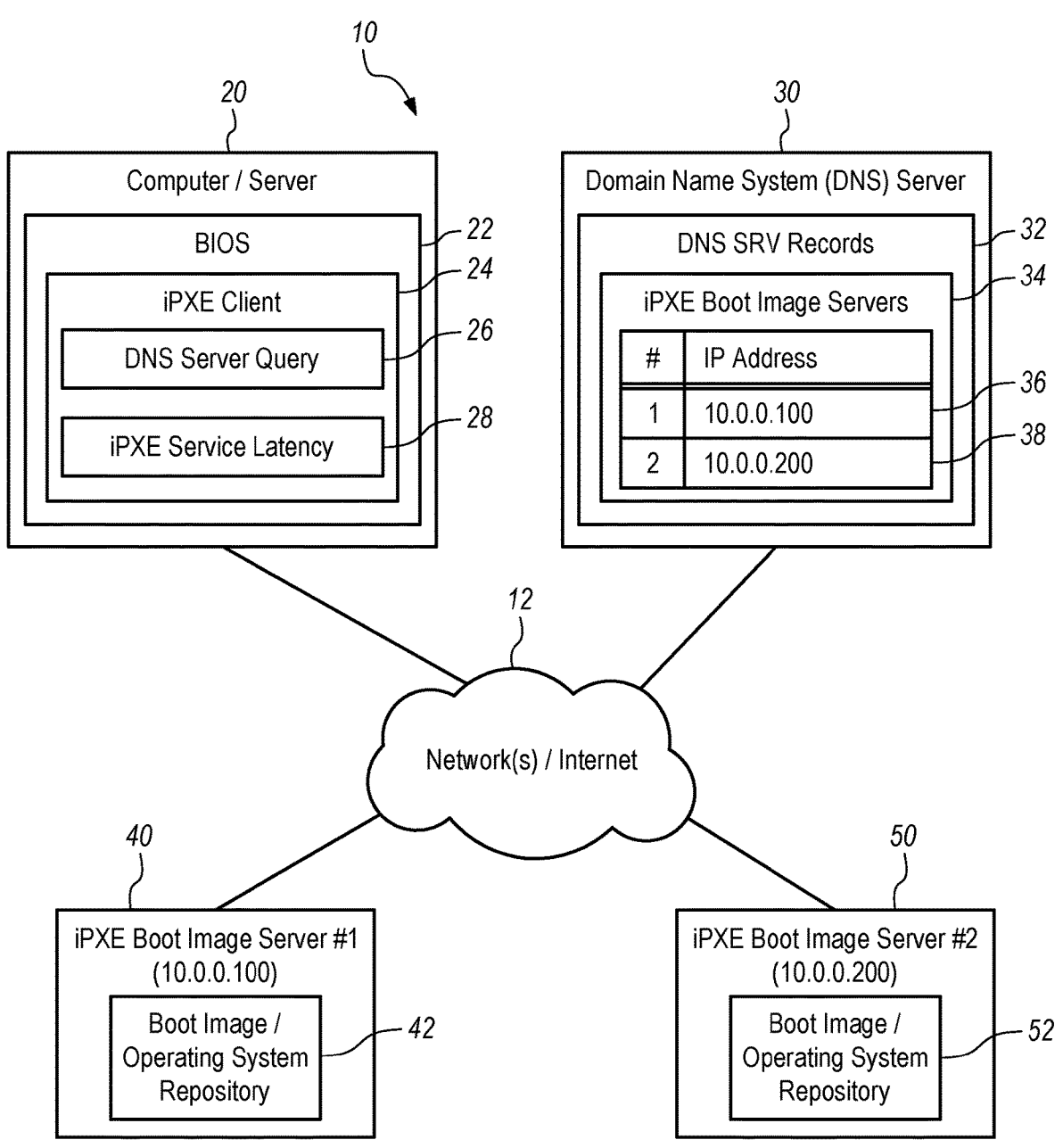
FIG. 1 is a diagram of a system in which embodiments may be implemented.

Some embodiments provide a computer program product comprising a non-volatile computer readable medium and non-transitory program instructions embodied therein, the program instructions being configured to be executable by a processor to cause the processor to perform various operations. The operations comprise loading an iPXE client that is stored in firmware on a computer that includes the processor, wherein the iPXE client implements Preboot eXecution Environment client software with the capability to use a wide area network communication protocol. The operations further comprise transmitting, during booting of the computer, a query over a wide area network to a Domain Name System server, wherein the query requests the location of iPXE boot image servers that store a boot image for use by the computer, and receiving, in response to the query, a DNS Service (SRV) record over the wide area network from the Domain Name System server. The DNS Service record identifies an Internet Protocol address for each of a plurality of iPXE boot image servers that are outside a subnet that includes the computer. In addition, the operations comprise determining one or more network properties of network communication between the computer and each iPXE boot image server identified by the Domain Name System server, identifying one of the plurality of iPXE boot image servers having the most suitable network properties for obtaining the boot image, and booting the boot image obtained from the identified iPXE boot image server.

iPXE is an open-source implementation of the Preboot eXecution Environment (PXE) client software and bootloader. iPXE can be used to enable a computer that does not have built-in PXE capability to boot from the network. To do so, iPXE must be configured with the IP address of an iPXE boot image server and communicate with the iPXE boot image server to obtain the boot image. The iPXE client software has the capability to use various communication protocols, including Trivial File Transfer Protocol (TFTP), Hypertext Transfer Protocol (HTTP), Internet Small Computer Systems Interface (ISCSI), ATA over Ethernet (AoE), and Fibre Channel over Ethernet (FCoE). Furthermore, the iPXE client software supports communication over a Wi-Fi wireless network protocol link. The boot image obtained from the iPXE boot image server enables the computer to boot. The boot image may include an operating system and may also include one or more application programs.

The Domain Name System (DNS) is a hierarchical and distributed naming system for computers, services and other resources on Internet Protocol (IP) networks, such as the Internet. DNS servers store a database of DNS records and can respond to queries against the database. One primary function of the DNS servers is to identify the IP address that has been assigned to each of a plurality of domain names. A domain name is a text-based label that identifies a particular computer, network or service on the Internet. Domain names are generally easier for people to remember and use than IP addresses, which are numerical labels assigned to a device connected to the IP network.

In addition to maintaining a list of domain names and their associated IP addresses, the database of DNS records may identify various types of services and the domain names and IP addresses associated with each service. For the present embodiments, a DNS server may identify one or more iPXE boot image servers that each provide a boot image service and identify the IP address associated with each iPXE boot image server. Accordingly, the program instructions of the boot code may cause the processor to transmit a query over a wide area network, such as the Internet, to a DNS server, wherein the query requests the location (for example, the IP Address) of one or more iPXE boot image servers (repositories of boot images) where the processor can obtain a boot image that is needed to complete the booting of the computer. The DNS server responds to the query by transmitting a responsive DNS Service (SRV) record over the wide area network from the Domain Name System server to the computer. The DNS SRV record identifies an IP address and/or the hostname and port number for each of a plurality of iPXE boot image servers providing boot images. The plurality of iPXE boot image servers may all be located on the wide area network, such as the Internet.

A subnet, also known as a subnetwork, is a logical subdivision of an IP network. Network devices, such as computers, that belong to the same subnet have an IP address with an identical group of most-significant bits. Accordingly, the IP address may be considered as containing two fields, where the most-significant bits identify a particular network and the least-significant bits identify a specific host device within the network.

In some embodiments, the program instructions that cause the processor to perform the operations are included in Basic Input Output System (BIOS) firmware stored on read-only memory installed on a system board of the computer. The Basic Input/Output System (BIOS) is firmware used to perform hardware initialization during the booting process (power-on startup) and to provide runtime services for operating systems and programs. The BIOS firmware comes pre-installed on a computer system board and exists in some UEFI-based systems to maintain compatibility with operating systems that do not support UEFI native operation. The BIOS in modern PCs initializes and tests the system hardware components (Power-On Self-Test; POST) and loads a bootloader which then initializes a kernel. The POST identifies, tests and initializes system devices such as the CPU, chipset, RAM, motherboard, video card, keyboard, mouse, hard disk drive, optical disc drive and other hardware, including integrated peripherals. Unified Extensible Firmware Interface (UEFI) is a successor to the legacy PC BIOS. In some embodiments, the iPXE client software may provide the bootloader. However, in other embodiments, the iPXE client software may chain-load a bootloader, such as a bootloader obtained from the iPXE boot image server.

Some embodiments provide the technical benefit of having a default factory configuration of the computer that can automatically discover possible boot images using the DNS SRV protocol without requiring any customization of the computer being deployed. Another technical benefit of some embodiments is the ability for the computer to boot from a boot image that is stored by an iPXE boot image server that is accessible over a wide area network, such as the Internet. A further technical benefit of some embodiments is the ability for the computer to automatically identify or select an iPXE boot image server from among the plurality of iPXE boot image servers identified by the DNS server, wherein the identified or selected iPXE boot image server has network properties meeting certain criteria. For example, the network properties may be selected from latency (delay in transmission between two points expressed in units of time), bandwidth (maximum capacity of a network connection expressed in units of digital information per unit of time, such as bits per second), and/or load (amount of data being carried by the network expressed in units of digital information per unit of time, such as bits per second). Any one or more of these network properties may form the basis for selecting the iPXE boot image server from which to obtain the boot image. In one option, latency may be the sole criteria used to identify or select the iPXE boot image server from which the computer will request and obtain the boot image.

In some embodiments, the iPXE boot image server may be identified to have the most suitable network properties for obtaining the boot image using various criteria. For example, an iPXE boot image server may be determined to have the most suitable network properties of any of the plurality of iPXE boot image servers in response to having the lowest latency, the highest bandwidth, the lowest load, the lowest load as a percentage of bandwidth, some combination of these criteria. Alternatively, the iPXE boot image server may be determined to have the most suitable network properties of any of the plurality of iPXE boot image servers based on some weighting or formula including latency, bandwidth and/or load.

In some embodiments, the one or more network properties includes network latency between the computer and each of the iPXE boot image servers identified by the Domain Name System server. In one example, the operation of determining one or more network properties of network communication between the computer and each iPXE boot image server identified by the Domain Name System server may include additional operations. Those additional operations may include, for each iPXE boot image server identified by Domain Name System server, transmitting an Internet Control Message Protocol echo request to the IP address of the iPXE image server, receiving an Internet Control Message Protocol echo reply from the iPXE boot image server, and determining a latency value based on a round-trip time between transmitting the Internet Control Message Protocol echo request to the iPXE boot image server and receiving the Internet Control Message Protocol echo reply from the iPXE boot image server. In one option, the Internet Control Message Protocol echo request is sent using a ping utility. Internet Control Message Protocol (ICMP) is a protocol in the Internet Protocol suite that is used to send operational information, such as diagnostics or control, rather than data. Other network properties, such as bandwidth and/or load, may be similarly obtained using available tools that may be run by the computer to discover or measure the system state.

In some embodiments, the computer may be a server. For example, the server may be one of a large number of servers being deployed in a datacenter. Alternatively, the computer may be an edge computer located outside of any cloud computing environment. An edge computer is a computer that is located closer to a user or source of data than is possible with a centralized group of servers, such as those of a datacenter. By moving the edge computer closer to user or source of data, the edge computer is able to provide computational support with reduced latency since communication between the edge computer and the user or source of data traverses a shorter path with fewer hops. It is a technical benefit that some embodiments enable deployment of an edge computer near a user or source of data without requiring customization.

In some embodiments, the iPXE server may serve as a single target providing a plurality of boot images available for booting the computer. Optionally, the computer may boot from one of the boot images that is selected according to some context information. For example, the iPXE server may render a menu of boot images that are user selectable or that are automatically selected based on information submitted by the computer in the query when accessing the iPXE server. In alternative embodiments, there may be a separate iPXE server and/or separate IP address for providing each of the boot images and the computer directs its query to the iPXE server and/or IP address that provides the desired boot image.

Some embodiments provide a computer-implemented method. The method comprises the operation of loading an iPXE client that is stored in firmware on a computer that includes the processor, wherein the iPXE client implements Preboot eXecution Environment client software with the capability to use a wide area network communication protocol. The operations further comprise transmitting, during booting of the computer, a query over a wide area network to a Domain Name System server, wherein the query requests the location of iPXE boot image servers that store a boot image for use by the computer, and receiving, in response to the query, a DNS SRV record over the wide area network from the Domain Name System server. The DNS SRV record identifies an Internet Protocol address for each of a plurality of iPXE boot image servers that are outside a subnet that includes the computer. In addition, the operations comprise determining one or more network properties of network communication between the computer and each iPXE boot image server identified by the Domain Name System server, identifying one of the plurality of iPXE boot image servers having the most suitable network properties for obtaining the boot image, and booting the boot image obtained from the identified iPXE boot image server. The computer may be deployed using the default settings from a manufacturer of the computer.

Some embodiments may provide a method comprising performing a network boot on a plurality of computers, the network boot for each computer comprising various operations. The operations may include loading an iPXE client that is stored in firmware on the computer, wherein the iPXE client implements Preboot eXecution Environment client software with the capability to use a wide area network communication protocol. The operations may further comprise transmitting, during booting of the computer, a query over a wide area network to a Domain Name System server, wherein the query requests the location of iPXE boot image servers that store a boot image for use by the computer, and receiving, in response to the query, a DNS SRV record over the wide area network from the Domain Name System server. The DNS SRV record identifies an Internet Protocol address for each of a plurality of iPXE boot image servers that are outside a subnet that includes the computer. In addition, the operations comprise determining one or more network properties of network communication between the computer and each iPXE boot image server identified by the Domain Name System server, identifying one of the plurality of iPXE boot image servers having the most suitable network properties for obtaining the boot image, and booting the boot image obtained from the identified iPXE boot image server. Using this method, the plurality of computers may each be deployed using the default settings established by a manufacturer of the computer.

The foregoing computer program products may further include program instructions for implementing or initiating any one or more aspects of the methods described herein. Similarly, the foregoing methods may include any of the operations described in reference to the computer program products.

FIG. 1 is a diagram of a system 10 in which embodiments may be implemented. A computer 20, such as a server, is to be deployed and is connected to one or more networks 12, such as the Internet. The computer 20 has a BIOS 22 that includes iPXE client software 24. The iPXE client software 24 includes a DNS Server Query module 26 and an iPXE Server Latency (or iPXE Server Network Properties) module 28. During boot of the computer 20, a processor (not shown) will begin to execute the code stored in the BIOS 22, including the iPXE client software 24. Accordingly, execution of the code (program instructions) of the DNS Server Query module 26 cause the processor to perform the operations of sending a query over the network(s) 12 to a Domain Name System (DNS) server 30.

The DNS server 30 stores DNS SRV records 32 including records 34 identifying two iPXE Boot Image Servers. The records 32, 34 may be stored in various types of data structures but are illustrated in the form of a table for the purpose of discussion. Accordingly, the iPXE Boot Image Servers identified in the records 34 include a first iPXE Boot Image Server ("1"; see row 36) having an IP Address of 10.0.0.100 and a second iPXE Boot Image Server ("2"; see row 38) having an IP Address of 10.0.0.200. In response to receiving the query from the computer 20, the DNS server 30 returns those of the DNS SRV records 32 that are responsive to the query. For the purpose of the present embodiments, the query requests the location of iPXE Boot Image Servers and the DNS server 30 returns the specific DNS SRV records 34 that identify the two iPXE Boot Image Servers, namely Server 1 at 10.0.0.100 and Server 2 at 10.0.0.200.

After the computer 20 receives the specific DNS SRV records 34, the computer 20 may use the iPXE Server Latency module 28 to ping the two iPXE Boot Image Servers, namely Server 1 at 10.0.0.100 and Server 2 at 10.0.0.200. Specifically, the iPXE Server Latency module 28 will ping the first iPXE Boot Image Server (Server "1") 40 at the IP address 10.0.0.100 and ping the second iPXE Boot Image Server (Server "2") 50 at the IP address 10.0.0.200. The iPXE Server Latency module 28 may then determine the latency of communication with the two iPXE Boot Image Servers based on the round-trip time of a signal sent to and received from the respective server.

The iPXE Server Latency module 28 or other module of the BIOS code 22 may select the iPXE Boot Image Server that has the lowest latency or overall best network properties. If the first iPXE Boot Image Server (Server "1") 40 is selected, then the iPXE client software 24 will send a message to the IP address 10.0.0.100 requesting a boot image 42. Conversely, if the second iPXE Boot Image Server (Server "2") 50 is selected, then the iPXE client software 24 will send a message to the IP address 10.0.0.200 requesting a boot image 52.

Figure 2:
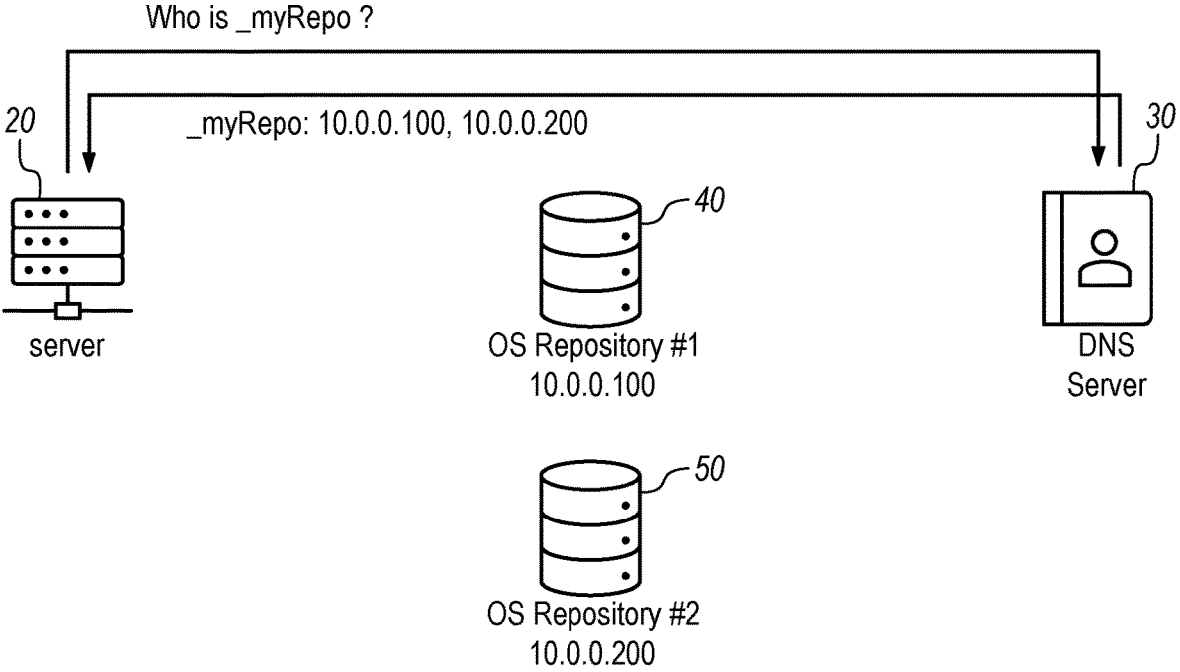
FIG. 2 is a diagram of a server transmitting a query to a Domain Name System server and receiving a reply from the Domain Name System server according to some embodiments.

FIG. 2 is a diagram of the computer 20 (here, server 20) transmitting a query ("Who is _myRepo?") to the DNS server 30. In this example, "repo" refers to an "OS repository" or iPXE Boot Image server. The DNS server 30 searches its records and sends a reply message ("-myRepo: 10.0.0.100, 10.0.0.200") to the server 20. In this example, the reply message has identified the IP addresses for a first OS repository or iPXE Boot Image server 40 and a second OS repository or iPXE Boot Image server 50. Accordingly, the server 20 was not customized to know the location of the iPXE Boot Image servers 40, 50, but the server 20 was able to obtain these locations using the default programming. Optionally, the server 20 may be an edge device.

Figure 3:
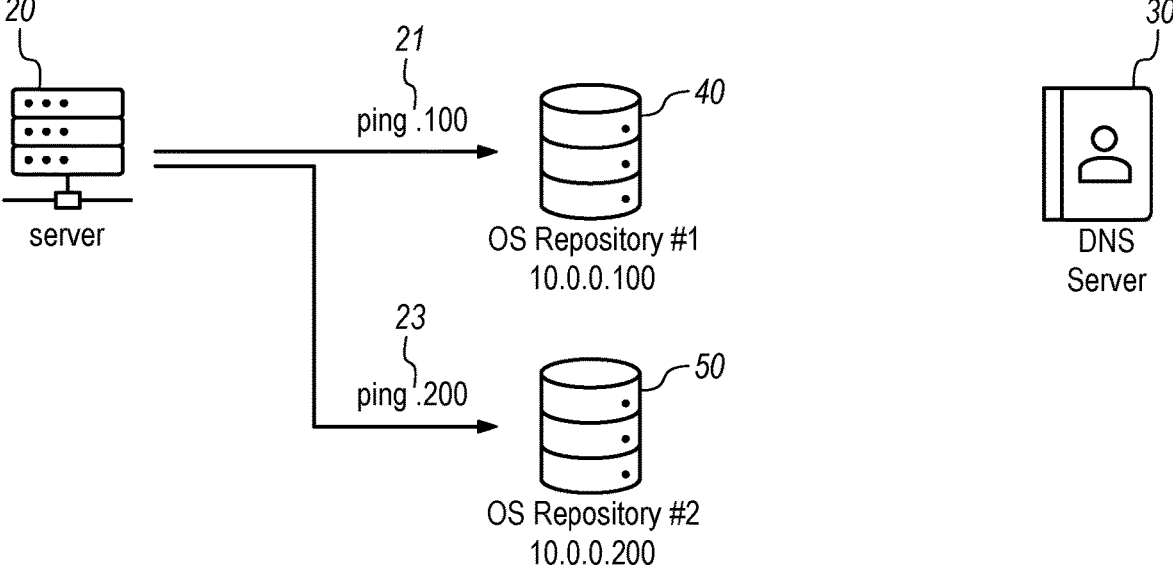
FIG. 3 is a diagram of the server transmitting a ping (Internet Control Message Protocol echo request) to two Operating System Repositories at the IP addresses received in the reply from the Domain Name System server.

FIG. 3 is a diagram of the server 20 transmits a first ping 21 (Internet Control Message Protocol echo request) to the first iPXE Boot Image server 40 ("Operating System Repository #1") at the IP address 10.0.0.100 and transmits a second ping 23 (Internet Control Message Protocol echo request) to the second iPXE Boot Image server 50 ("Operating System Repository #1") at the IP address 10.0.0.200. Note that the path from the server 20 to the first iPXE Boot Image server 40 may have a different distance and/or different number of hops than the path from the server 20 to the second iPXE Boot Image server 50.

Figure 4:
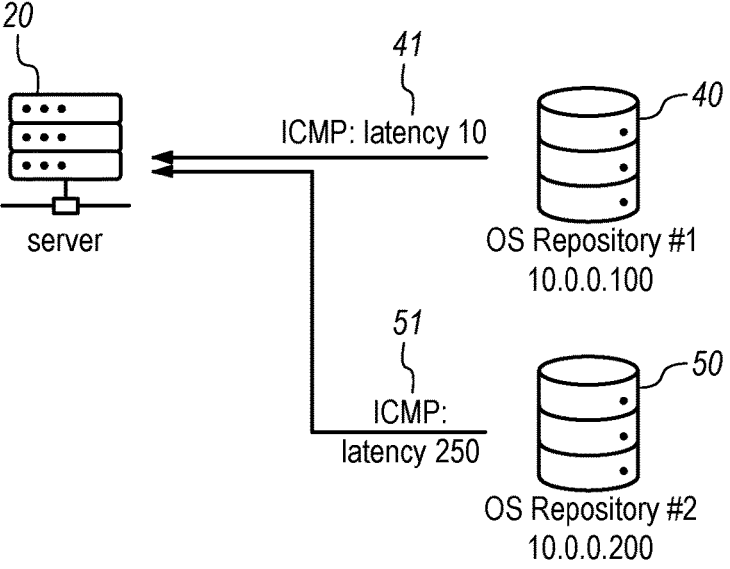
FIG. 4 is a diagram of the server receiving an Internet Control Message Protocol echo reply enabling the server to determine a latency metric, such as round-trip time.
Figure 4:
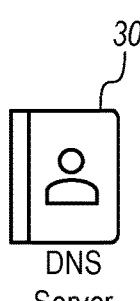

FIG. 4 is a diagram of the server 20 receiving a first Internet Control Message Protocol echo reply 41 from the first OS repository or iPXE Boot Image server 40 enabling the server 20 to determine a value of a latency metric, such as round-trip time, for communication between the servers 20, 40. Furthermore, the server 20 is also receiving a second Internet Control Message Protocol echo reply 51 from the second OS repository or iPXE Boot Image server 50 enabling the server 20 to determine a value of a latency metric, such as round-trip time, for communication between the servers 20, 50. In this example, the server 20 has determined that the latency with server 40 is about 10 units (perhaps 10 milliseconds) and that the latency with server 50 is about 250 units (perhaps 250 milliseconds). It should be noted that both iPXE Boot Image servers 40, 50 are reachable, but there is much less latency in communicating with the first iPXE Boot Image server 40. Accordingly, the server 20 may select the first iPXE Boot Image server 40 as a preferred repository for obtaining a boot image. In some embodiments, the server 20 could measure additional static and/or dynamic network properties (e.g. latency, bandwidth, load, etc.) and use a combination of the values of these properties to selected a preferred repository for obtaining the boot image.

Figure 5:
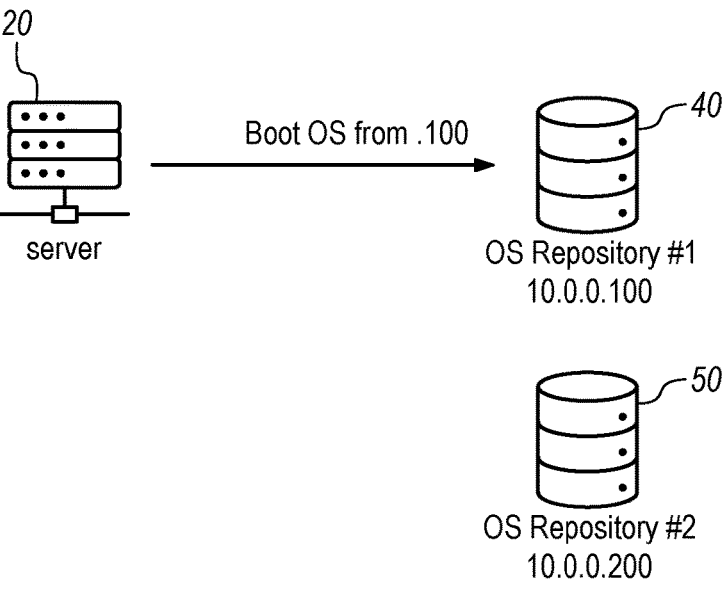
FIG. 5 is a diagram of the server booting from the Operating System Repository for which there is less network latency.
Figure 5:
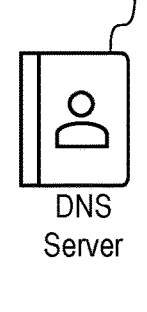

FIG. 5 is a diagram of the server 20 booting from the first iPXE Boot Image server 40 (Operating System Repository #1) at the IP Address 10.0.0.100 for which there is less network latency. Other aspects of the iPXE boot process would proceed as it would in a typical situation where the IP Address of the repository destination has been specified by an administrator or provisioning software suite.

Figure 6:
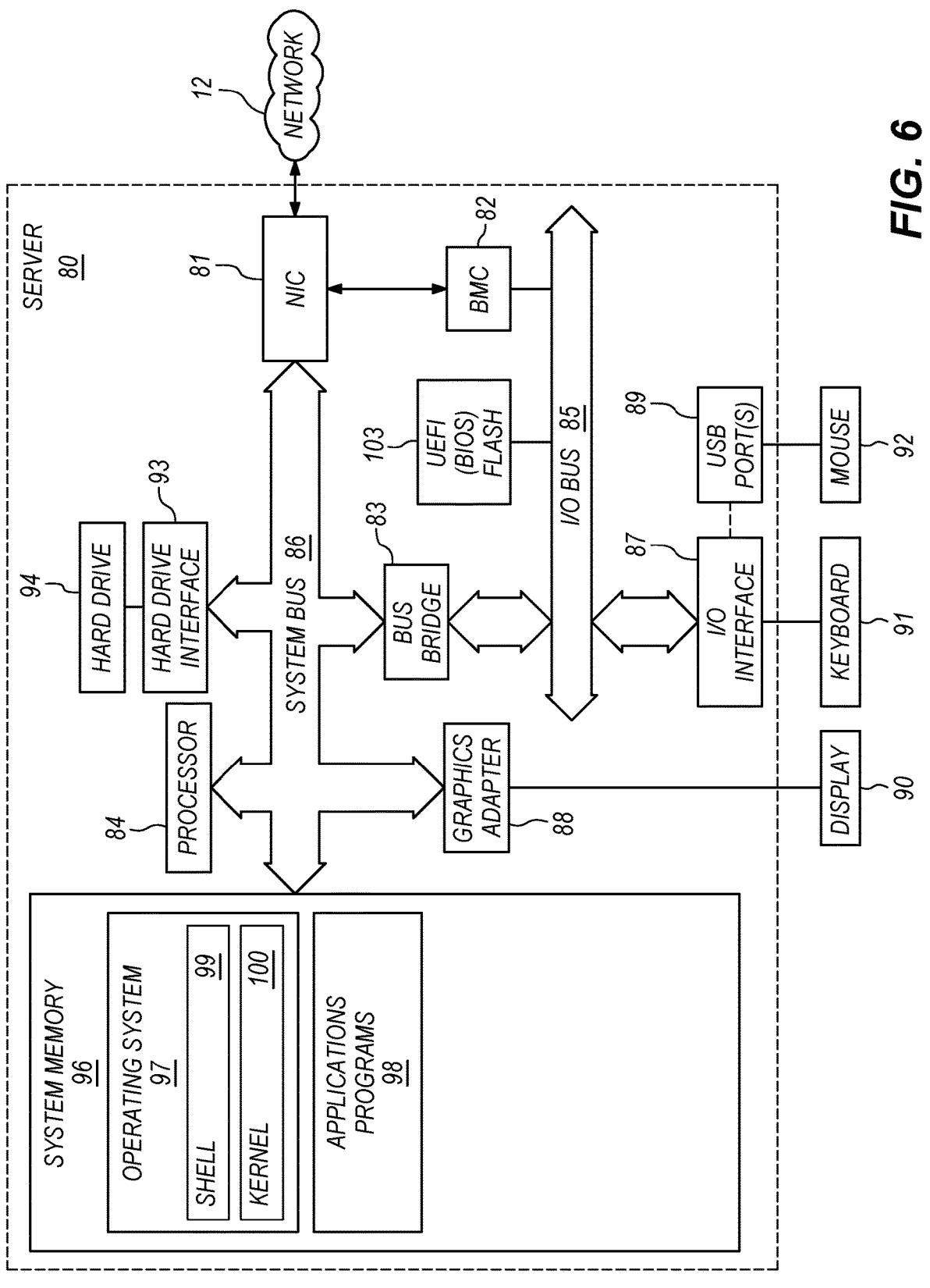
FIG. 6 is a diagram of a computer or server according to some embodiments.

FIG. 6 is a diagram of a computer or server according to some embodiments. For example, the server 80 may be representative of the computer 20, the DNS server 30, the first iPXE Boot Image server 40, and/or the second iPXE Boot Image server 50 shown in FIG. 1. The server 80 includes a processor unit 84 that is coupled to a system bus 86. The processor unit 84 may include two or more central processing units, each of which has one or more cores. A graphics adapter 88, which may drive/support a display 90, is also coupled to the system bus 86. The graphics adapter 88 may, for example, include a graphics processing unit (GPU). The system bus 86 is coupled via a bus bridge 83 to an input/output (I/O) bus 85. An I/O interface 87 is coupled to the I/O bus 85. The I/O interface 87 affords communication with various I/O devices, such as a keyboard 91 (perhaps as a touch screen virtual keyboard), and a USB mouse 92 via USB port(s) 89 (or other type of pointing device, such as a trackpad). As depicted, the server 80 may communicate with other devices over the network 12 using a network adapter or network interface controller (NIC) 81, which may be a Smart NIC. The hardware elements depicted in the server 80 are not intended to be exhaustive, but rather are representative. For instance, the server 80 may further include non-volatile memory and the like.

A hard drive interface 93 is also coupled to the system bus 86. The hard drive interface 93 interfaces with a hard drive 94. In a preferred embodiment, the hard drive 94 communicates with system memory 96, which is also coupled to the system bus 86. System memory is the lowest level of volatile memory in the server 80. This volatile memory may include additional higher levels of volatile memory (not shown), including, but not limited to, cache memory, registers and buffers. Data that populates the system memory 96 may include an operating system (OS) 97 and application programs 98.

The operating system 97 includes a shell 99 for providing transparent user access to resources such as application programs 98. Generally, the shell 99 is a program that provides an interpreter and an interface between the user and the operating system. More specifically, the shell 99 executes commands that are entered into a command line user interface or from a file. Thus, the shell 99, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 100) for processing. Note that while the shell 99 may be a text-based, line-oriented user interface, embodiments may support other user interface modes, such as graphical, voice, gestural, etc.

As depicted, the operating system 97 also includes the kernel 100, which may include lower levels of functionality for the operating system 97, including providing essential services required by other parts of the operating system 97 and application programs 98. Such essential services may include memory management, process and task management, disk management, and mouse and keyboard management. As shown, the system 80 includes application programs 98 in the system memory of the server 80.

The server 80 further includes the baseboard management controller (BMC) 82, which may be located on a motherboard along with the processor 84. The BMC may be used to perform out-of-band processing and may monitor and manage various features of the hardware components of the server. Furthermore, the server 80 includes a Unified Extensible Firmware Interface (UEFI) Basic Input Output System (BIOS) flash 103. For example, the BIOS flash 103 may store the BIOS code (see BIOS 22 in FIG. 1). The illustrated components of the server 80 are representative and should not be interpreted as limiting.

Figure 7:
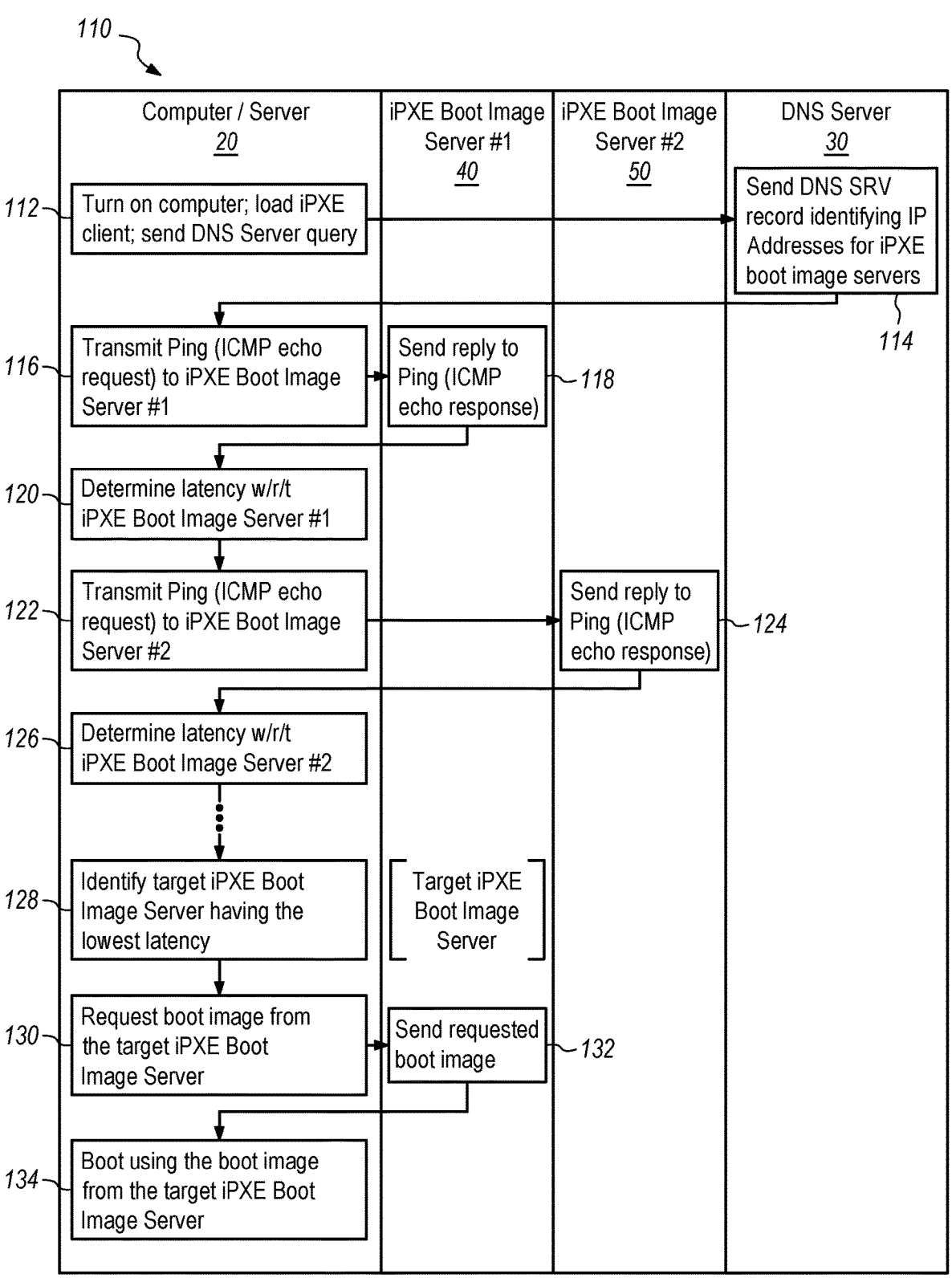
FIG. 7 is a flowchart of operations according to some embodiments.

FIG. 7 is a flowchart of operations 100 according to some embodiments. Operations performed by the computer/server 20 are shown in a first column, operations performed by the first iPXE boot image server 40 are shown in a second column, operations performed by the second iPXE boot image server 50 are shown in a third column, and operations performed by the DNS Server 30 are shown in a fourth column (see also FIG. 1).

Operation 112 includes turning on the computer, loading an iPXE client that is stored in firmware, and sending a query over a wide area network to a Domain Name System server. The iPXE client implements Preboot eXecution Environment client software with the capability to use a wide area network communication protocol and the query requests the location of iPXE boot image servers that store a boot image for use by the computer. Operation 114 includes the DNS Server 30 responding to the query by sending a DNS SRV record over the wide area network to the computer/server 20, wherein the DNS SRV record identifies an Internet Protocol address for each of a plurality of iPXE boot image servers. Operation 116 includes transmitting a ping (Internet Control Message Protocol echo request) to the first iPXE boot image server 40. Operation 118 includes the first iPXE boot image server 40 sending a reply to the ping (Internet Control Message Protocol echo response) to the computer/server 20. Operation 120 includes determining a latency value based on a round-trip time between transmitting the Internet Control Message Protocol echo request to the first iPXE boot image server 40 and receiving the Internet Control Message Protocol echo reply from the iPXE boot image server 40.

Operation 122 includes transmitting a ping (Internet Control Message Protocol echo request) to the second iPXE boot image server 50. Operation 124 includes the second iPXE boot image server 50 sending a reply to the ping (Internet Control Message Protocol echo response) to the computer/server 20. Operation 126 includes determining a latency value based on a round-trip time between transmitting the Internet Control Message Protocol echo request to the second iPXE boot image server 50 and receiving the Internet Control Message Protocol echo reply from the second iPXE boot image server 50. Note that the operations 116, 118 and 120 are similar to the operations 122, 124 and 126 apart from which of the iPXE Boot Image servers 40, 50 are the subject of the ping. It should be recognized that the same operations could be performed for any number of iPXE Boot Image servers that may be identified by the DNS Server 30.

Operation 128 includes identifying a target iPXE boot image server having the most suitable network properties for obtaining the boot image, such as the lowest latency. In this example, the first iPXE Boot Image server 40 is identified as the target iPXE Boot Image server. Operation 130 includes requesting a boot image from the target iPXE Boot Image server, which has been identified to be the first iPXE Boot Image server 40. Operation 132 includes the first iPXE Boot Image server 40 sending the requested boot image to the computer/server 20. Operation 134 includes the computer/server 20 booting the boot image obtained from the identified target iPXE Boot Image server.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

loading an implementation of the Preboot execution Environment (iPXE) client that is stored in firmware on a computer that includes the processor, wherein the iPXE client implements Preboot execution Environment client software with the capability to use a wide area network communication protocol;

transmitting, during booting of the computer, a query over a wide area network to a Domain Name System server, wherein the query requests the location of at least one boot image server that stores a boot image for use by the computer;

receiving, in response to the query, a Domain Name System Service record over the wide area network from the Domain Name System server, wherein the Domain Name System Service record identifies an Internet Protocol address for each of a plurality of boot image servers that are outside a subnet that includes the computer;

determining one or more network properties of network communication between the computer and each of the plurality of boot image servers;

selecting one of the plurality of boot image servers for obtaining the boot image using the determined one or more network properties as selection criteria; and booting the boot image obtained from the selected boot image server.

2. The computer program product of claim 1, wherein determining one or more network properties of network communication between the computer and each boot image server identified by the Domain Name System server includes:

transmitting, for each boot image server identified by the Domain Name System server, an Internet Control Message Protocol echo request to the IP address of the boot image server;

receiving, for each boot image server identified by the Domain Name System server, an Internet Control Message Protocol echo reply from the boot image server; and determining, for each boot image server identified by the Domain Name System server, a latency value based on a round-trip time between transmitting the Internet Control Message Protocol echo request to the boot image server and receiving the Internet Control Message Protocol echo reply from the boot image server.

3. The computer program product of claim 2, wherein the Internet Control Message Protocol echo request is sent using a ping utility.

4. The computer program product of claim 1, wherein the one or more network properties of network communication include latency, bandwidth, and/or load.

5. The computer program product of claim 1, wherein the plurality of boot image servers are located on the wide area network.

6. The computer program product of claim 1, wherein the computer is an edge computer located outside of any cloud computing environment.

7. The computer program product of claim 1, wherein the computer is a server.

8. The computer program product of claim 1, wherein the selected boot image server is configured to provide a plurality of boot images, and wherein the program instructions are configured to cause the processor to automatically select from the plurality of boot images the boot image used in the booting.

9. The computer program product of claim 1, wherein the boot image includes an operating system.

10. The computer program product of claim 1, wherein the program instructions are included in basic input output system firmware stored on read-only memory.

11. The computer program product of claim 1, wherein the wide area network is the Internet.

12. A computer-implemented method, comprising:

loading an implementation of the Preboot eXecution Environment (iPXE) client that is stored in firmware on a computer that includes the processor, wherein the iPXE client implements Preboot eXecution Environment client software with the capability to use a wide area network communication protocol;

transmitting, during booting of the computer, a query over a wide area network to a Domain Name System server, wherein the query requests the location of at least one boot image server that stores a boot image for use by the computer;

receiving, in response to the query, a Domain Name System Service record over the wide area network from the Domain Name System server, wherein the Domain Name System Service record identifies an Internet Protocol address for each of a plurality of boot image servers that are outside a subnet that includes the computer;

determining one or more network properties of network communication between the computer and each boot image server identified by the Domain Name System server;

selecting one of the plurality of boot image servers for obtaining the boot image using the determined one or more network properties as selection criteria; and booting the boot image obtained from the selected boot image server.

13. The computer-implemented method of claim 12, wherein determining one or more network properties of network communication between the computer and each boot image server identified by the Domain Name System server includes:

transmitting, for each boot image server identified by the Domain Name System server, an Internet Control Message Protocol echo request to the IP address of the boot image server;

receiving, for each boot image server identified by the Domain Name System server, an Internet Control Message Protocol echo reply from the boot image server; and determining, for each boot image server identified by the Domain Name System server, a latency value based on a round-trip time between transmitting the Internet Control Message Protocol echo request to the boot image server and receiving the Internet Control Message Protocol echo reply from the boot image server.

14. The computer-implemented method of claim 13, wherein the computer is deployed using the default settings from a manufacturer of the computer.

15. The computer-implemented method of claim 12, wherein the plurality of boot image servers are located on the wide area network.

16. The computer-implemented method of claim 12, wherein the boot image includes an operating system.

17. A method comprising:

performing a network boot on a plurality of computers, the network boot for each computer comprising:

loading an implementation of the Preboot execution Environment (iPXE) client that is stored in firmware on the computer, wherein the iPXE client implements Preboot execution Environment client software with the capability to use a wide area network communication protocol;

transmitting, during booting of the computer, a query over a wide area network to a Domain Name System server, wherein the query requests the location of at least one boot image server that stores a boot image for use by the computer;

receiving, in response to the query, a Domain Name System Service record over the wide area network from the Domain Name System server, wherein the Domain Name System Service record identifies an Internet Protocol address for each of a plurality of boot image servers that are outside a subnet that includes the computer;

determining one or more network properties of network communication between the computer and each boot image server identified by the Domain Name System server;

selecting one of the plurality of boot image servers for obtaining the boot image using the determined one or more network properties as selection criteria; and booting the boot image obtained from the selected boot image server.

18. The method of claim 17, wherein determining one or more network properties of network communication between the computer and each boot image server identified by the Domain Name System server includes:

transmitting, for each boot image server identified by the Domain Name System server, an Internet Control Message Protocol echo request to the IP address of the boot image server;

receiving, for each boot image server identified by the Domain Name System server, an Internet Control Message Protocol echo reply from the boot image server; and determining, for each boot image server identified by the Domain Name System server, a latency value based on a round-trip time between transmitting the Internet Control Message Protocol echo request to the boot image server and receiving the Internet Control Message Protocol echo reply from the boot image server.

19. The method of claim 18, wherein the computer is deployed using the default settings from a manufacturer of the computer.

20. The method of claim 17, wherein the plurality of computers are a plurality of servers on a local area network.

\* \* \* \* \*